United States Patent [19]

Farrington, Jr. et al.

[11] 3,864,136

[45] Feb. 4, 1975

[54] DIRECT BONDED REFRACTORY BRICK HAVING IMPROVED HOT STRENGTH AND ITS METHOD OF MANUFACTURE

[75] Inventors: Grant M. Farrington, Jr., Marlton; Ronald Staut, Cherry Hill, both of N.J.

[73] Assignee: General Refractories Company, Philadelphia, Pa.

[22] Filed: Nov. 5, 1973

[21] Appl. No.: 412,917

[52] U.S. Cl. .................................................. 106/59
[51] Int. Cl. ............................................ C04b 35/42
[58] Field of Search ....................................... 106/59

[56] References Cited
UNITED STATES PATENTS
3,360,387   12/1967   Padfield .............................. 106/59

Primary Examiner—J. Poer
Attorney, Agent, or Firm—Finnegan, Henderson, Farabow & Garrett

[57] ABSTRACT

Direct bonded refractory bricks are provided containing 40 to 70 percent by weight magnesia, 60 to 30 percent by weight chrome ore, and having an overall lime to silica ratio less than 0.30 and a silica content of less than 2.5 percent by weight based on the weight of the brick. The silicate phase of the bricks is essentially non-wetting and non-reactive with secondary spinels at 2,700°F. The lime to silica ratio and silica content are controlled by adding a hydrated silicate compound, such as a magnesium silicate, to the magnesia-chrome ore mixture before it is fired.

15 Claims, No Drawings

DIRECT BONDED REFRACTORY BRICK HAVING IMPROVED HOT STRENGTH AND ITS METHOD OF MANUFACTURE

This invention relates to improved directed bonded refractory bricks and shapes and their method of manufacture. More specifically, this invention relates to direct bonded refractory bricks having improved hot strength and having high density and relatively low porosity.

Direct bonded refractory bricks or shapes are prepared from refractory compositions comprising predominantly chrome ore and magnesia. The chrome ore consists essentially of the chromite spinel with minor accessory silicate gangue minerals. The magnesia consists essentially of magnesium oxide with minor amounts of silicates and other impurities. Magnesium oxide in its pure form is often referred to as periclase.

Specifically, refractory chrome ores like most other ores are obtained from natural deposits. Refractory chrome are consists of a solid solution of minerals containing $Cr_2O_3$, MgO, $Al_2O_3$ and iron oxides with a siliceous mineral gangue. On an oxide basis, refractory chrome ore usually analyzes from about 0.5 to 9 percent of $SiO_2$.

Refractory magnesia is made by "dead burning" the mineral magnesite ($MgCO_3$), or such magnesium compounds as the hydrate or the chloride, to obtain a residual dense grain of magnesium oxide of stable character. The term "dead burning," as used in relation to magnesite denotes a procedure in which magnesite is heated to from about 1,600° to 2,300°C.

In recent years, materials of greater purity have become available. For example, by beneficiation, chrome ores with a silica content as low as 1 to 2 percent can be obtained. An equally important change has occurred in commercially available refractory magnesia which now commonly analyzes 97 to 99+ percent MgO. In these relatively pure refractory magnesia, the silica usually consitutes less than 1 percent by weight on an oxide basis.

In conventional magnesia chrome and/or chrome magnesia refractories, the magnesia phase is bonded to the chromite phase by silicates. These silicates, such as merwinite, forsterite and monticellite, are developed by reaction of the magnesia with the gangue silicates of the chrome ore. The bonding structure is essentially a bridgework of silicate connecting and joining the predominant magnesia and chromite spinel phases. In direct bonded refractories the periclase and chromite spinel phases are, as the name implies, directly joined together without intervention of a silicate phase. The present invention, as described above, is concerned with direct bonded refractory shapes.

In the manufacture of direct bonded refractory bricks and shapes, chrome ore and magensia of optimum grain sizing are mixed along with appropriate temporary binders in predetermined proportionate quantities. Such binder compositions will usually consist of small amounts of water and a binder material or materials. Some typical binder materials would include lignosulfonates, magnesium, salts, chromic and sulfuric acids, and the like.

The mixture of chrome ore, magnesia and binder is blended and pressed in a mold under a pressure in excess of 5,000 psi and preferably about 15,000 to 20,000 psi. This pressed or molded shape is then dried in a suitable manner, such as, for example, in an oven effective therefor and having a temperature in the range of about 90° to 180°C and preferably about 100° to 125°C. The most effective pressure and temperature combination for any particular ore blend is, of course, readily determinable by one skilled in the art. After mixing, pressing and drying, the refractory shapes are fired in a kiln at maturing temperatures usually in excess of at least about 1,650°C. Generally and preferably, such firing will be conducted at a maturing temperature in the range of about 1,700° to 1,900°C.

As stated above, in direct bonded refractories, the periclase and chromite spinel phases are joined together without intervention of a silicate phase. The degree or quantity of so-called direct bonds between particulate chrome ore and dead burned magnesia constituents, however, varies from the brick of one brick batch to that of another. Further, in any given direct bonded brick, there usually exists a certain amount of silicate bonding where a predominantly basic silicate phase is interposed between and bonds periclase grain to periclase grains, periclase grains to secondary spinel grains, and periclase grains to primary chrome grains. In such a brick, there also usually exists some cracks, voids, or spaces between adjacent mineralogically dissimilar particles, along with the desired areas of direct attachment. In a representative sample, as viewed under the microscope, a skilled mineralogist can actually count the various types of bonds (or lack of bonds) and arrive at statistically significant quantitative indications of the degree of direct bonding in a given sample.

The layers of silicate phase developed in conventional direct bonded brick are disadvantageous because they prevent such bricks from having high strength at elevated temperature by preventing the development of the desirable direct bond between the various periclase, secondary spinel, and primary chrome ore phases present. On the other hand, the presence of large amounts of silicate is often necessary in commercial direct bonded bricks to promote the properties of high density (about 3.0 g/cc to 3.2 g/cc) and relatively low porosity (about 17-18 percent) that has been found necessary to obtain proven service results.

The prior art has sought to overcome the problem of providing high hot strength refractory brick by a number of different processes, but each of these processes suffers from disadvantages. For example, U.S. Pat. No. 3,360,387 to Padfield describes a method of increasing the hot strength of a silicate (forsterite) bonded, as opposed to a direct bonded, brick by lowering the lime to silica ratio of the material by effectively increasing the silica content. Although this method increases the hot strength and decreases the open porosity, the continuous silicate bonding and high amounts of silicates (5.5%$SiO_2$ and higher) render the brick vulnerable to severe slagging or deterioration. Refractory bricks find substantial application in steel producing furnaces, and the problem of the potentially severe slagging of the Padfield bricks is especially acute when the bricks are exposed to high lime containing slags found in such furnaces. The high lime content of the slag would react with the readily available silicate bond to increase the lime/silica ratio of the brick and form excessive amounts of lower melting silicates, and thereby destroy the hot strength properties of this brick. However, in the case of the present invention, the low c/s ratio promotes direct bonding between the various phases in the brick, isolating the silicate phase in discrete pockets. The silicates are therefore not available for reaction with the slag and bonding integrity of the brick is preserved.

U.S. Pat. No. 3,522,065 to Herron describes a method for making a low porosity direct bonded, low silica, brick by fine grinding all of the magnesia and chrome ore to at least −150 mesh, and preferably −325 mesh, to increase the contact areas between the grains in the mix and thereby increase the rate of diffusion and solution of the chrome ore constituents in the magnesia and in the liquid silicate phase which is formed at the high temperatures used to fire the bricks. Such a brick is not commercially feasible, however, because of the difficulties in forming and firing a fine grained mangesia-chrome ore composition.

SUMMARY OF THE INVENTION

The present invention provides a direct bonded refractory brick comprised of 30 to 80 percent by weight magnesia, 70 to 20 percent by weight chrome ore, and having an overall lime to silica ratio less than about 0.30 and a silica content of less than about 2.5 percent by weight on an oxide basis. By maintaining the overall lime to silica ratio below 0.30 and the silica content at 2.5 percent or less, a direct bonded brick is obtained having a high number of direct bonds, a high hot strength, and a low open porosity. The microstructure of a hot fracture surface of the brick is characterized by the presence of secondary spinels, by the presence of non-wetting silicates, by the presence of broken grains, and by a high crushing strength at elevated temperature, properties which result from the desired degree of direct bonding.

The present invention also provides a process for producing a direct bonded refractory brick having a high hot strength. This process comprises controlling the overall lime to silica ratio of a brick containing 30 to 80 percent by weight magnesia and 70 to 20 percent by weight chrome ore, to provide a lime to silica ratio of less than about 0.30 and controlling the silica content to be less than 2.5 percent by weight.

Preferably, the overall lime to silica ratio and silica content of the brick are controlled by adding a hydrated silicate compound to the magnesia-chrome ore mixture. The hydrated silicate compound is preferably a magnesium silicate such as talc. The overall lime to silica ratio is preferably maintained at less than a 0.30.

This invention enables the production of a direct bonded refractory brick of conventional grain sizing with exceptionally high hot strength. The direct bonded refractory brick of the invention has a low open porosity and a low silica content, and can be produced in conventional forming and firing equipment.

An additional advantage of the direct bonded refractory brick of the invention is the good slag resistance produced as a result of direct bonding and a low level of isolated silicates.

It is to be understood that both the foregoing general description and the following detailed description are exemplary and explanatory, but are not restrictive to the invention.

DETAILED DESCRIPTION OF THE INVENTION

The refractory bricks of the present invention are fired, direct bonded bricks prepared from a mixture of chrome ore and magnesia. The chrome ore-magnesia ratio in the refractory composition can vary widely. A refractory composition suitable for forming a direct bonded refractory shape in accordance with the present invention comprises by weight in the range of about 30 to 80 percent magnesia and about 70 to 20 percent chrome ore. Preferably, such a composition comprises 40 to 60 percent magnesia and about 60 to 40 percent chrome ore.

Both the magnesia and chrome ore should be relatively pure with respect to silicate content. Specifically, the silicates in magnesia should constitute less than 2 percent by weight of the ore and preferably less than 1 percent. The silicates in the chrome ore should constitute less than 5 percent and preferably less than 4 percent silica. The present invention includes both magnesia-chrome ore and chrome ore-magnesia brick. Magnesia-chrome ore bricks are those prepared from a batch comprising dead burned magnesite (or any other source of magnesia) and chrome ore in which the dead burned magnesite or equivalent is predominant. Chrome-magnesia bricks are prepared from batches in which the chrome ore is predominant.

In accordance with the invention, both the overall lime to silica ratio of the refractory composition and the silica content of the refractory composition are controlled to provide a direct bonded refractory composition having improved properties. The overall lime to silica ratio of the refractory composition is controlled to be less than about 0.3 and the silica content of the refractory composition is controlled to be less than 2.5 percent by weight, based on the total weight of the refractory composition.

The overall lime to silica ratio and silica content of the refractory composition are controlled by addition of a silica yielding compound to the mixture of chrome ore and magnesia. The silica yielding compound can be one that consists essentially of silica or preferably is a silicate compound. The silicate compound is preferably a magnesium silicate, such as talc, olivine, serpentine, enstitite, or magnesia containing a higher silica content than that used to form the primary magnesia phase of the composition. At present talc is the preferred magnesium silicate compound that is used to control the lime to silica ratio and silica content of the refractory composition. Other suitable silica yielding compounds that can be used in the practice of the present invention include $SiO_2$, silica fume, silica gel, ethyl silicate, and silicic acid.

The silicate compound is preferably a hydrated decomposible compound such as talc. Hydrated silicate compounds lose water during the heating of the refractory composition which fires the composition. The loss of water produces a highly active material in a fine particle form which reacts with magnesia and constituents in chrome ore faster than coarser, lower surface particles during the firing cycle. Talc is an especially preferred hydrated silicate because it forms a rather low melting (1,543°C) liquid which is active in liquid phase sintering reactions at lower temperatures of about 1,400° to 1,600°C. Talc, however, combines at higher temperatures of 1,600°C to 1,800°C used during firing, with excess MgO to form additional refractory silicates which do not detract from hot strength. These refractory silicates are predominantly, forsterite with some, monticellite depending on the ultimate lime to silica ratio. The presence of talc also appears to be beneficial as a pressing aid during the forming process.

Generally, to bring the lime to silica ratio and silica content within the parameters set forth above, a compound such as talc, or another silica source, will have to be added to the chrome ore-magnesia mixture, but it is to be understood that the present invention includes the selection of and blending of silica containing magnesia and chrome ores to provide mixtures inherently possessing the desired lime to silica ratio and silica content. In some applications, it is possible that a CaO source will have to be added to the chrome ore-magnesia mixture to bring the composition within the desired parameters, but in most instances, silica is the compound that has to be added.

Generally, the refractory compositions will have an $Fe_2O_3$ content of between about 3 and about 20 percent, and $Al_2O_3$ content of between about 3 and about 22 percent, a $Cr_2O_3$ content of between about 10 and 30 percent, and a total lime content of less than 1 percent.

After the overall lime to silica ratio and silica content of the refractory composition is adjusted to the parameters set forth above, the composition is processed in accordance with conventional refractory shaping procedures. Thus, the composition is first pressed into a desired shape, such as a brick, in a mold under a pressure in excess of 5,000 psi and preferably about 10,000 to 20,000 psi. This pressed or molded shape is then dried in a suitable manner, and fired in a kiln at maturing temperatures usually in excess of at least about 1,650°C, and preferably in the range of 1,700° to 1,900°C.

Actually, other than the procedures employed during the mixing stage as stated herein, the process is similar to the steps used in the prior art techniques. It should be noted that the term "firing" as employed herein shall embrace all three stages of the total cycle, namely, "heating," "holding," and "cooling." By "heating stage" is meant that portion of the firing cycle wherein the temperature of the pressed refractory composition is elevated from room temperature to the desired maturing temperature. The "holding stage" is that portion of the firing cycle wherein the maturing temperature is maintained for a predetermined amount of time. And, of course, the "cooling stage" comprises lowering the temperature of the brick from maturing temperature to room temperature or thereabout.

The fired refractory shapes of the present invention are direct bonded and exhibit excellent hot crushing strength and hot modulus of rupture. For example, a fired shape having an overall silica content of 2.0 percent and a lime to silica ratio of 0.29 shows a hot crushing strength of 2,265 psi at 2,800°F and a modulus of rupture of 2,300 psi at 2,700°F. The silicate phases developed during the firing are essentially non-wetting because as shown by the microstructure of a refractory shape fractured at 2,700°F, the silicate phases are isolated from the magnesia and chrome ore grains and shows that the fired shape is direct bonded rather than silicate bonded.

The silicate phases in the refractory shapes of this invention are non-reactive with secondary spinels at a temperature of 2,700°F. Test results have shown that the silicate phase does not dissolve the secondary spinels at such a high temperature and that there is no resulting increase in the overall amount of liquid present. Finally, the microstructure of a fracture surface includes broken grains indicating that the fracture occurs through the grains as would occur in direct bonding and not through the matrix as would occur in silicate bonding.

To achieve the beneficial results of the present invention, both the silica to lime ratio and silica content must be maintained within the critical parameters described above. Thus, holding the silica content at 2 percent and increasing the lime/silica ratio to greater than 0.30, such as 0.67, greatly decreases the hot crushing strength at 2,800°F and deteriorates the microstructure. Also, maintaining the lime/silica ratio below 0.30 but increasing the silica content above 2.5 percent leads to a silicate bonded brick rather than a direct attachment between periclase grains and chrome spinels.

The lime/silica ratio is preferably maintained at 0.25 or less. As most magnesias and chrome ores contain at least some lime, the minimum lime/silica ratio that normally can be obtained in the practice of the present invention is 0.1. The silica content of the composition is preferably maintained at a minimum of 0.3 percent. Below this amount uneconomically high firing temperatures are required for a suitable direct bonded refractory.

The many facets of this invention are further illustrated by the following examples which are not to be construed as limitations thereof. Various other embodiments, modifications, and equivalents of these examples readily suggest themselves to those skilled in the art without departing from the spirit of the present invention or the scope of the appended claims. All percentages and parts referred to herein are by weight unless otherwise specifically indicated. All screen sizes are Tyler Sieve Series unless otherwise noted.

EXAMPLE 1

A brick composition is prepared by blending 60 parts of a fine high purity magnesia containing only ball mill fines, 60 percent of which is less than 325 mesh and all of which is less than 200 mesh, with 40 parts of a fine chrome ore containing only ball mill fines, 60 percent of which is less than 325 mesh and all of which is less than 200 mesh.

The chrome ore and magnesia employed have the following analysis:

| Chrome Ore | |
|---|---|
| LOI (Loss on Ignition) | 0.11 |
| $SiO_2$ | 2.50 |
| $Al_2O_3$ | 29.70 |
| $Fe_2O_3$ | 14.60 |
| CaO | 0.35 |
| MgO | 13.80 |
| $Cr_2O_3$ | 36.0 |
| $B_2O_3$ | — |

| Magnesia | |
|---|---|
| LOI | 0.12 |
| $SiO_2$ | 0.52 |
| CaO | 0.61 |
| $Fe_2O_3$ | 0.30 |
| $Al_2O_3$ | 0.29 |
| MgO | 98.03 |
| $Cr_2O_3$ | — |
| $B_2O_3$ | 0.13 |

The composition initially has an overall silica content of 1.35 percent but in accordance with the present invention this content is adjusted to 2.0 percent by addition of 0.7 percent Supersil, a finely ground silica containing 100 percent of −325 mesh particles. As a result of the addition of silica, the composition has a lime to silica ratio of 0.29. The composition is pressed into a brick at 15,000 psi and fired in a furnace at a temperature of 3,200°F for 6 hours under normal firing conditions. Upon completion of firing and after cooling of the brick to room temperature, it is examined for density, porosity, and hot strength. The results of the examination are set forth in Table 1 below.

Table 1

| Fired Density (g/cc) | 3.10 g/cc |
| Open porosity (%) | 17.3% |
| Hot Modulus of Rupture (psi) at 2700°F | 2300 |
| Hot Crush Strength (psi) at 2800°F | 2265 |

The brick is fractured at 2,700°F and its microstructure is then examined. The microstructure exhibits areas of isolated, non-wetting silicates which indicate that the brick has true direct bonds rather than silicate bonds. The microstructure also exhibits areas of secondary spinels which shows that the silicate phase does not dissolve the secondary spinels of this composition at high temperature.

A dissolving of secondary spinels at this temperature would increase the overall amount of liquid present at the test temperature which would result in decreased strength. The microstructure also shows that the periclase grains are broken and thus indicates that the fracture occurred through the grains. A fracture through the grains indicates that direct bonds are present rather than silicate bonds because silicate bonds would soften at high temperatures showing only fracture through the matrix rather than through both grain and matrix.

EXAMPLE 2

The procedure of Example 1 is repeated with a 60 part magnesia, 40 part chrome ore blend having hte same chemical analysis as in Example 1 except that in addition to the use of fine silica to increase the overall silica content of the composition to 2 percent, lime is added to the composition to increase the overall lime to silica ratio to 0.67. This increase in lime to silica ratio is above that required for the practice of the present invention, but does not result in an increase of the silicate content of the composition. Upon completion of firing and after cooling to room temperature, the brick is examined for density, porosity and hot strength. The results of the examination are set forth in Table 2 below.

Table 2

| Fired Density (g/cc) | 3.06 g/cc |
| Open porosity (%) | 18.6% |
| Hot Modulus of Rupture (psi) at 2700°F | 533 |
| Hot Crush Strength (psi) at 2800°F | 1257 |

A comparison of the results obtained from the brick of Example 1 produced in accordance with the teachings of the inventors, and the results obtained from the brick of this Example, which differs from that of Example 1 only in having a higher lime to silica ratio, shows that significantly better results are achieved with the brick of the present invention. In fact, the hot modulus of rupture at 2,700°F for the brick produced in accordance with the present invention is more than four times greater than that achieved for the brick of this Example. Also, the hot crush strength at 2,800°F for the brick of this invention is almost twice that achieved by the brick of this Example.

The brick of this Example is fractured at 2,700°F and its microstructure is examined. The microstructure exhibits an absence of isolated silicate phase and shows no evidence of the presence of secondary spinels. The silicate phase has apparently dissolved the secondary spinels which would cause an overall increase in the liquid content of the refractory at elevated temperatures. The microstructure also does not show any broken grains. The fracture occurred through the matrix which indicates that direct bonds are not present and that silicate bonds are present. This example illustrates the importance of maintaining the lime to silica ratio within the teachings of the present invention to obtain the benefits of the present invention.

EXAMPLE 3

A batch refractory composition consisting of the following components is prepared:

| | Amount | Compound | Mesh Size (Tyler Screen) |
| --- | --- | --- | --- |
| (1) | 10% | magnesia | −4+8 mesh |
| (2) | 18% | magnesia | −8+28 mesh |
| (3) | 25% | magnesia | −325 mesh ball mill fines |
| (4) | 26% | chrome ore | −10+28 mesh |
| (5) | 20% | chrome ore | −28 mesh |
| (6) | 1% | talc | −200 mesh |

The overall chemistry of this composition is:

| $SiO_2$ | 2.3% |
| CaO | 0.5% |
| $Fe_2O_3$ | 7.2% |
| $Al_2O_3$ | 14.0% |
| MgO | 60.0% |
| $Cr_2O_3$ | 16.0% |

The composition has a lime to silica ratio of 0.22.

The composition is pressed into brick shapes and fired for 6½ hours at 3,200°F. The resulting properties of the fired brick are set forth in Table 3 below.

Table 3

| 3.08 g/cc | Bulk density |
| −0.03% | Volume change |
| 725 psi | Hot Modulus of Rupture (2700°F) |
| 16.6% | Porosity |

The brick composition has an excellent hot modulus of rupture of 725 psi at 2,700°F and a low porosity of 16.6 percent. The combination of these properties are not typical or expected for direct bonded magnesia-chrome ore containing 2.3% $SiO_2$. Usually such compositions have either a significantly lower hot modulus of rupture or a significantly higher porosity.

EXAMPLE 4

A batch refractory composition representing a chromemagnesia material consisting of the following components is prepared.

|     | Amount | Compound     | Mesh Size (Tyler Screen)     |
| --- | ------ | ------------ | ---------------------------- |
| (1) | 20     | chrome ore I | −4+8 mesh                    |
| (2) | 20     | chrome ore I | −8+28 mesh                   |
| (3) | 30     | chrome ore II| −28+100 mesh                 |
| (4) | 30     | magnesia     | −200 mesh ball mill fines    |

The chemistry of the magnesia is the same as Example 1. The chemistry of the chrome ore used is as follows:

|            | Chrome Ore I | Chrome Ore II |
| ---------- | ------------ | ------------- |
| $SiO_2$    | 5.0          | 1.1           |
| CaO        | 0.3          | 0.3           |
| $Fe_2O_3$  | 13.0         | 26.0          |
| $Al_2O_3$  | 29.5         | 16.0          |
| MgO        | 18.0         | 10.5          |
| $Cr_2O_3$  | 34.2         | 46.1          |

| | |
|---|---|
| $SiO_2$   | 2.5  |
| CaO       | 0.5  |
| $Fe_2O_3$ | 13.0 |
| $Al_2O_3$ | 16.6 |
| MgO       | 39.8 |
| $Cr_2O_3$ | 27.6 |

The composition has a lime silica ratio of 0.2.

The composition is pressed into brick shapes and fired for 6 hours at 3,120°F. The resulting properties of the fired brick are set forth in Table 4 below.

Table 4

| | |
|---|---|
| 3.16 g/cc | Bulk Density |
| −0.50% | Volume Change |
| 800 psi | Hot Modulus of Rupture (2700°F) |
| 15.8% | Porosity |

The invention in its broader aspects is not limited to the specific details shown and described and departures may be made from such details without departing from the principles of the invention and without sacrificing its chief advantages.

What is claimed is:

1. A direct bonded refractory shape comprising about 30 to about 80 percent by weight magnesia, about 70 to about 20 percent by weight chrome ore, and having an overall lime to silica ratio less than about 0.30 and a silica content of less than about 2.5 percent, based on the total weight of the refractory shape.

2. The refractory shape of claim 1 wherein the overall lime to silica ratio is less than about 0.25.

3. The refractory shape of claim 1 wherein 40 to 60 percent by weight magnesia is present and 60 to 40 percent by weight chrome ore is present.

4. A process for preparing a direct bonded refractory shape comprising mixing magnesia and chrome ore in a weight percent of about 30 to 80 parts magnesia to about 70 to about 20 parts chrome ore, and maintaining the overall lime to silica ratio of the mixture at about less than 0.30 and the silica content at less than about 2.5 percent by weight of the mixture, pressing the mixture to form a shaped article, and firing the shaped article.

5. The process of claim 4 wherein the lime to silica ratio and silica content of the refractory composition is maintained at the desired values by adding a silica yielding compound to the chrome ore-magnesia mixture before it is shaped.

6. The process of claim 5 wherein the silica yielding compound is a silicate.

7. The process of claim 6 wherein the silicate is a magnesium silicate.

8. The process of claim 6 wherein the magnesium silicate is talc, olivine, serpentine or enstitite.

9. The process of claim 6 wherein the silicate is a hydrated magnesium silicate.

10. The process of claim 9 wherein the silicate is talc.

11. The process of claim 4 wherein the lime to silica ratio and silica content of the refractory composition are maintained at the desired values by adding silica as $SiO_2$, olivine, enstitite, silica fume, silica gel, ethyl silicate, or silicic acid.

12. The process of claim 4 wherein the lime to silica ratio and silica content of the refractory composition are maintained by blending silica containing magnesias and silica containing chrome ores.

13. The process of claim 5 wherein the overall lime to silica ratio is maintained at less than 0.25.

14. The process of claim 5 wherein the overall lime to silica ratio is maintained at from 0.1 to less than 0.30, and the silica content is from 0.3 to less than 2.5 percent.

15. A process for preparing a direct bonded refractory shape comprising mixing magnesite and chrome ore in a weight percent of about 40 to 60 parts magnesia to about 60 to 40 parts chrome ore, adding 0.1 to 4 percent of talc to maintain the overall lime to silica ratio of.the mixture at about less than 0.30 and the silica content at less than about 2.5 percent by weight of the mixture, pressing the mixture to form a shaped article, and firing the shaped article.

* * * * *